(12) United States Patent
Bahrami et al.

(10) Patent No.: US 11,609,748 B2
(45) Date of Patent: Mar. 21, 2023

(54) SEMANTIC CODE SEARCH BASED ON AUGMENTED PROGRAMMING LANGUAGE CORPUS

(71) Applicant: FUJITSU LIMITED, Kawasaki (JP)

(72) Inventors: Mehdi Bahrami, San Jose, CA (US); Wei-Peng Chen, Fremonth, CA (US); Shrikanth Narayanaswamy Chandrasekaran, Raleigh, NC (US)

(73) Assignee: FUJITSU LIMITED, Kawasaki (JP)

( * ) Notice: Subject to any disclaimer, the term of this patent is extended or adjusted under 35 U.S.C. 154(b) by 213 days.

(21) Appl. No.: 17/161,545

(22) Filed: Jan. 28, 2021

(65) Prior Publication Data
US 2022/0236964 A1 Jul. 28, 2022

(51) Int. Cl.
*G06F 9/44* (2018.01)
*G06F 8/33* (2018.01)
*G06F 16/9032* (2019.01)
*G06N 20/00* (2019.01)

(52) U.S. Cl.
CPC .......... *G06F 8/33* (2013.01); *G06F 16/90332* (2019.01); *G06N 20/00* (2019.01)

(58) Field of Classification Search
USPC .......................................................... 717/110
See application file for complete search history.

(56) References Cited

U.S. PATENT DOCUMENTS

| 11,334,949 | B2* | 5/2022 | Kim | G06Q 20/127 |
| 2018/0174684 | A1* | 6/2018 | Eastman | G16H 50/20 |
| 2020/0027567 | A1* | 1/2020 | Xie | G06V 10/82 |
| 2021/0318865 | A1* | 10/2021 | Farivar | G06F 8/77 |

OTHER PUBLICATIONS

Feng, Zhangyin, et al.; "Codebert: A Pre-Trained Model for Programming and Natural Languages" Nov. 16, 2020.
Husain, Hamel, et al.; "Codesearchnet Challenge: Evaluating the State of Semantic Code Search" Jun. 8, 2020.
U.S. Appl. No. 17/116,956, filed Dec. 9, 2020.
U.S. Appl. No. 17/085,894, filed Oct. 30, 2020.

* cited by examiner

*Primary Examiner* — Anna C Deng
(74) *Attorney, Agent, or Firm* — Maschoff Brennan

(57) ABSTRACT

A method may include obtaining machine-readable source code. The method may include parsing the source code for one or more code descriptions and identifying a section of the source code corresponding to each of the code descriptions. The method may include determining a description-code pair including a first element representing the code description and a second element representing the section of the source code corresponding to the code description. The method may include generating an augmented programming language corpus based on the description-code pair, the one or more code descriptions, and the source code. The method may include receiving a natural language search query for source-code recommendations, identifying source code from the augmented programming language corpus responsive to the natural language search query, and responding to the natural language search query with the identified source code.

20 Claims, 6 Drawing Sheets

SEMANTIC CODE SEARCH BASED ON AUGMENTED PROGRAMMING LANGUAGE CORPUS

The present disclosure generally relates to performing a semantic code search based on an augmented programming language corpus.

BACKGROUND

A programming language is a language that includes computer-readable syntax. Statements written in the programming language may provide instructions to a computer such that the computer may interpret and execute the provided instructions to perform tasks. Programming languages include words and phrases that may be grouped together to generate computer-readable expressions and statements. A collection of valid expressions and statements may define a syntax for a programming language.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments may include a method that includes obtaining machine-readable source code. The method may also include parsing the source code for one or more code descriptions and identifying a section of the source code corresponding to each of the code descriptions. The method may include determining a description-code pair including a first element representing the code description and a second element representing the section of the source code corresponding to the code description. The method may include generating an augmented programming language corpus based on the one or more description-code pair, the one or more code descriptions, and the source code. The method may also include training a machine learning model to provide source-code recommendations based on the augmented programming language corpus. The method may include receiving a natural language search query for a source-code recommendation, and identifying, by the machine learning model, the source code responsive to the search query. The method may include responding to the natural language search query with the source code identified from the augmented programming language corpus.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

Figure 1:
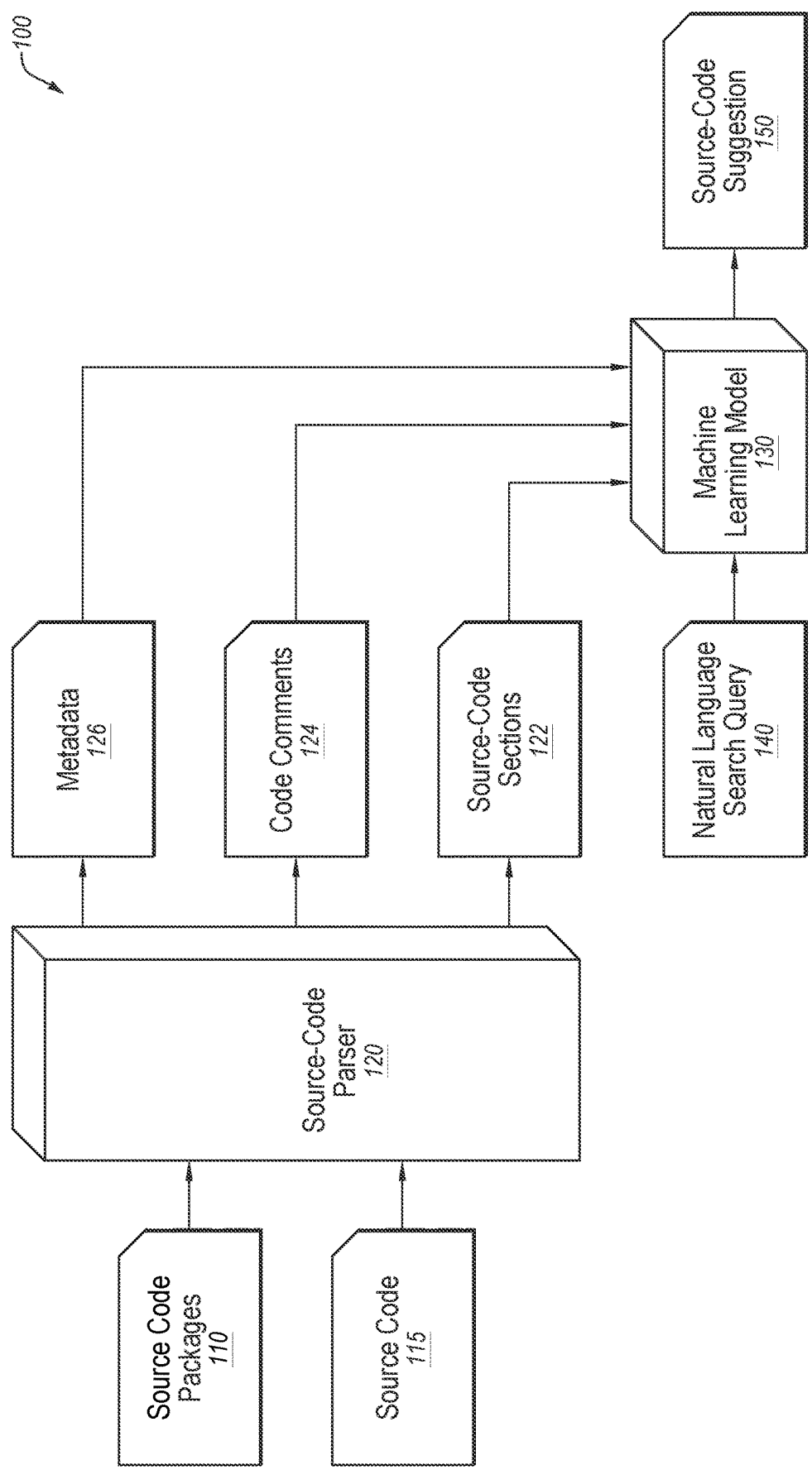
FIG. 1 is a diagram representing an example system related to generating an augmented programming language corpus and performing a code search based on the augmented programming language corpus for a given natural language search query.

The embodiments described in the present disclosure may relate to, among other things, generating an augmented programming language corpus associated with a given programming language. Such an augmented programming language corpus may include statements and expressions written using proper syntax in the given programming language as source code. The augmented programming language corpus may include code comments written in a natural language describing one or more sections of the source code. The augmented programming language corpus may include resources that explain usage and/or syntax of the given programming language. The augmented programming language corpus may include resources that explain the meaning or semantics of statements and expressions in the augmented programming language corpus.

In some embodiments, the augmented programming language corpus may be used to train a machine learning model. In these and other embodiments, the machine learning model may be trained to respond to a natural language search query (e.g., a search query written in English or Japanese) requesting code recommendations based on the augmented programming language corpus. Additionally or alternatively, the machine learning model may be trained to return responses including statements written in valid syntax for the given programming language as source-code recommendations.

Some machine learning models may not provide helpful or accurate source-code recommendations based on user queries. For example, some code recommendations may not be relevant or responsive to the user queries. A user may not be able to determine whether such source-code recommendations are most relevant to a user-generated query and/or helpful to the user. Such shortcomings may particularly affect those unfamiliar with or inexperienced with a given programming language.

The present disclosure may, among other things, improve the context, relevance, and/or accuracy of source-code recommendations returned by a machine learning model trained using an augmented programming language corpus generated according to the present disclosure. For example, the generated augmented programming language corpus may provide descriptions for source-code recommendations in the augmented programming language corpus based on at least comments included in pieces of source code. In these and other embodiments, the comments included in the source code may describe specific functions and/or lines of source code. The machine learning model may be trained to identify which sections of the source code a given code comment describes such that the given code comment may be included with a source-code recommendation returned by the machine learning model. Additionally or alternatively, the applicability of the given code comment to the particular section of source code may provide further insight for the machine learning system in determining the applicability of the particular sections of source code to queries. For example, by properly associating particular comments with particular sections of source code, those sections of source code may be better classified and/or identified by the machine learning system. In these and other embodiments, the machine learning model may return source-code recommendations along with descriptions and/or instructions of usage based on the augmented programming language corpus.

Certain embodiments of the present disclosure may provide improvements over previous iterations of programming language corpuses and/or machine learning models trained to provide source-code recommendations based on programming language corpus training data. For example, software development may be improved by configuring a computer system in a manner in which the computing system is able to provide source-code searching results with more context and better descriptions of the source-code searching results. As another example, software development may be improved by providing integrated development environments with plug-ins that aid users to develop software applications based on descriptions included in the augmented programming language corpus. As an additional example, software development may be improved by configuring a computer system in a manner in which the computing system is able to provide source-code searching results with improved accuracy.

Another advantage of the present disclosure may include the ability to distinguish between similar code comments that describe dissimilar sections of source code. For example, a first code comment associated with a first section of source code and a second code comment associated with a second section of source code may both state "function describes how to graph y as a function of x." However, the first section of source code and the second section of source code may describe dissimilar functions and/or methods of graphing a y-variable as a function of an x-variable. The relevance of source-code recommendations made by machine learning models trained according to the present disclosure may be improved relative to previous iterations of machine learning models.

Embodiments of the present disclosure are explained with reference to the accompanying figures.

FIG. 1 is a diagram of an example system 100 related to generating an augmented programming language corpus and performing a source-code search based on the augmented programming language corpus and a natural language search query. The system 100 may include a source-code parser 120 and a machine learning model 130. The source-code parser 120 may obtain one or more source-code packages 110 and/or source code 115 and output source-code sections 122, code comments 124, and/or source-code metadata 126. The machine learning model 130 may be trained using the source-code sections 122, the code comments 124, and/or the source-code metadata 126 to output one or more source-code recommendations 150 responsive to a natural language search query 140.

The source-code parser 120 may obtain one or more source-code packages 110 and/or source code 115. In some embodiments, the source-code packages 110 may include source code and/or metadata related to the source-code packages 110, such as information describing a programming language version, author, license, etc. of a given source-code package. The source-code packages 110 may be obtained from one or more libraries and/or repositories of source code, such as GITHUB, SOURCEFORGE, etc. The source-code packages 110 may include source code relating to functions written in a given programming language. In some embodiments, obtaining the source-code packages 110 may include the source-code parser 120 crawling or accessing various libraries and/or repositories. Additionally or alternatively, obtaining the source-code packages 110 may include a user manually providing the one or more source-code packages 110 and/or the source code 115 to the source-code parser 120.

In some embodiments, the source-code parser 120 may identify sections of source code in the one or more source-code packages 110 and/or the source code 115. In some embodiments, the sections of source code identified in the source-code packages 110 and/or the source code 115 may include sections of the source code that describe functions written in the given programming language. For example, a source-code parser may determine a given piece of source code is written in PYTHON, and the source-code parser may identify sections in the given piece of source code including one or more PYTHON classes, functions and methods. The source-code parser may identify code comments corresponding to the sections in the given piece of source code including the PYTHON functions and/or metadata associated with the given piece of source code. Obtaining and parsing source-code packages may be described in further detail below in relation to FIG. 4.

The machine learning model 130 may obtain the source-code sections 122, the code comments 124, and/or the source-code metadata 126 identified by the source-code parser 120. The machine learning model 130 may generate an augmented programming language corpus based on the source-code sections 122, the code comments 124, and/or the source-code metadata 126. Examples of generation of the augmented programming language corpus may be described in greater detail with reference to FIGS. 2 and/or 3.

In some embodiments, the machine learning model 130 may receive the natural language search query 140. In some embodiments, the natural language search query 140 may be made by a user and/or a computing system, and the natural language search query 140 may include a request for a source-code recommendation. For example, a user may be interested in implementing source code that can perform a given task. The user may not understand how to write such source code, may use the query as a time-saving mechanism, and/or source code written by the user fails to perform the given task. In such an example, the user may describe the given task as a natural language search query and the machine learning model 130 may output source-code recommendations based on the natural language search query 140, the source-code sections 122, the code comments 124, and/or the source-code metadata 126. Examples of such queries and responses may be described with greater detail in FIGS. 2 and 5.

Modifications, additions, or omissions may be made to the system 100 without departing from the scope of the disclosure. For example, the designations of different elements in the manner described is meant to help explain concepts described herein and is not limiting. For instance, in some embodiments, the source-code parser 120 and the machine learning model 130 are delineated in the specific manner described to help with explaining concepts described herein but such delineation is not meant to be limiting. Further, the system 100 may include any number of other elements or may be implemented within other systems or contexts than those described.

Figure 2:
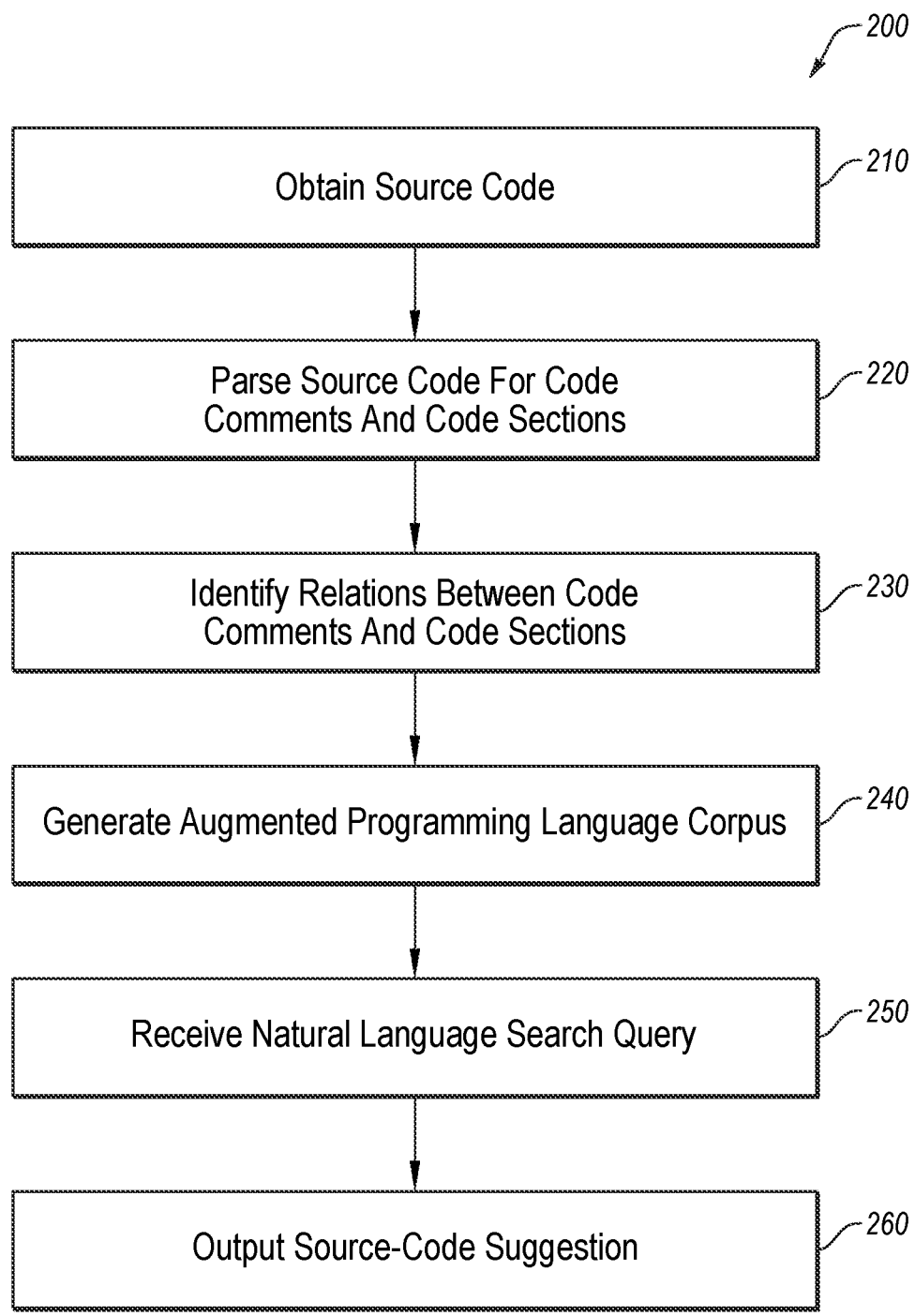
FIG. 2 is a flowchart of an example method of generating the augmented programming language corpus and performing the code search.

FIG. 2 is a flowchart of an example method 200 of generating the augmented programming language corpus and performing the code search. The method 200 may be performed by any suitable system, apparatus, or device. For example, the system 100, the source-code parser 120, and/or the machine learning model 130 may perform one or more of the operations associated with the method 200. Although illustrated with discrete blocks, the steps and operations associated with one or more of the blocks of the method 200 may be divided into additional blocks, combined into fewer blocks, or eliminated, depending on the particular implementation.

At block 210, source code may be obtained. The source code may include source code from any number of sources including open-source projects (e.g., GITHUB projects, SOURCEFORGE projects, GITLAB projects, etc.), if-this-then-that (IFTTT) recipes, proprietary software, etc. Unnecessary information in the source code may be removed to provide more searchable source code. Unnecessary information in the source code may include extraneous line breaks, white space, unnecessary symbols (such as "/" or ">"), etc. Removing unnecessary information from the obtained source code may facilitate parsing and/or searching within the source code, which may allow for extraction of previously uncaptured features. In some embodiments, the source code may be obtained from source-code packages, such as source-code packages 110 of FIG. 1. In cases where the source-code packages include source code written in more than one programming language, the source-code packages may be parsed to identify source code written in the programming language of interest. For example, a given source-code package may be parsed for .py files if the programming language of interest is PYTHON or .js files if the programming language of interest is JAVASCRIPT. Additionally or alternatively, code from multiple programming languages may be separated into their respective programming languages.

At block 220, the obtained source code may be parsed to identify sections of the source code, code comments, and/or metadata associated with the source code. For example, the obtained source code may be parsed by the source-code parser 120 of FIG. 1. In these and other embodiments, code comments and/or sections of the source code may be identified based on specific source-code syntax. For example, sections of obtained source code describing functions written in PYTHON may be identified based on the presence of "def" on a given line of the obtained source code and subsequent line indentations. The presence of "def" at the start of a line of code indicates a function is described by subsequent indented lines of code. As another example, a given code comment written in C may be identified based on the presence of "/*" at the start of the given code comment and the presence of "*/" at the end of the given code comment. Additionally or alternatively, the obtained source code may be parsed using an abstract syntax tree (AST) to identify various sections included in the obtained source code as separate nodes in the AST. For example, a function including an if-statement may be parsed by the AST to identify a first section of source code corresponding to an if-conditional statement, a second section of source code corresponding to nested operations and/or then-conditional statements included in association with the if-statement, and a third section of source code corresponding to operations included in an else-body.

At block 230, relationships between the sections of the source code, the code comments, and/or the metadata associated with the source code may be identified. Code comments may describe different aspects of a piece of source code, and the source code may include one or more code comments throughout the piece of source code. For example, a first code comment may describe an overarching purpose of the source code; a second code comment may explain a purpose of and/or how to use a given function included in the source code; a third code comment may explain a purpose of and/or how to use a second given function included in the source code; a fourth code comment may clarify a meaning and/or purpose of a specific line of source code; etc. Metadata associated with the source code may include information about the source code identified from related sources. For example, metadata about a given piece of source code may be obtained from question and answer (Q&A) forums discussing the source code (e.g., forum posts on STACKOVERFLOW), tutorials describing usage and/or implementation of the given piece of source code, GITHUB comments, issue messages, etc.

Relationships between sections of the source code and code comments may be created by identifying which section of the source code each code comment describes. A code comment may be categorized as a function description comment or a non-function description comment based on whether the code comment describes a function or a specific line of source code. The categorized code comment may be paired with the section of the source code that the categorized comment describes. In some embodiments, the categorized code comment and the section of the source code may be paired as a description-code pair or vector. Categorization of the code comment may be facilitated by heuristically determining a scope of the code comment as described in further detail below in relation to FIG. 3.

At block 240, an augmented programming language corpus may be generated and/or a machine learning model may be trained based on the augmented programming language corpus. The augmented programming language corpus may include a vector set including the description-code vectors. In some embodiments, the description-code vectors included in the augmented programming language corpus may be considered positively classified examples for training the machine learning model such that the machine learning model is trained to consider the code description paired to the section of source code in a positively classified description-code vector to be a valid relation. In other words, the machine learning model may be taught that a given positively classified description-code vector describes one example of a correct association of a natural language code description, represented by the code comment, and a section of source code.

In some embodiments, one or more negatively classified examples may be derived from the description-code pairs included in the augmented programming language corpus. Negatively classified examples may be used to train the machine learning model to identify incorrect associations between code descriptions and sections of source code. In some embodiments, negatively classified examples may be generated by rearranging description-code vector elements and source-code elements of the positively classified description-code vectors. For example, a given set of positively classified vectors may include pairs of description-code pairs (<D, C>) as {<D1, C1>, <D2, C2>, <D3, C3>}. In such an example, a set of negatively classified vectors may include {<D2, C1>, <D3, C1>, <D1, C2>, <D3, C2>, <D1, C3>, <D2, C3>}.

In some embodiments, quality of the trained machine learning model may be verified using validation data and/or testing data. The description-code vectors included in the augmented programming language corpus may be separated into a training data group, a validation data group, and a testing data group. In some embodiments, the number of description-code vectors categorized as the training data group may be greater than the number of description-code vectors categorized as the validation data group and/or the testing data group, such as a ratio of 8:1:1. In these and other embodiments, the machine learning model may be trained using the training data group such that the machine learning model learns heuristics and/or rules for predicting a section of source code corresponding to a code description, such as a code comment written in a natural language. Additionally or alternatively, the machine learning model may provide source-code recommendations based on the predictions the machine learning model may make regarding pairing sections of source code to code descriptions. The heuristics and/or rules determined by the machine learning model may be validated based on the validation data group by testing the heuristics and/or rules that the machine learning model learned using the description-code vectors included in the validation data group. The learned heuristics and/or rules may be revised based on application of the learned heuristics and/or rules to the validation data group. Performance of the machine learning model may be tested by determining the accuracy of the machine learning model based on the testing data group. The machine learning model may apply the learned heuristics and/or rules to the testing data group, and an accuracy of the machine learning model may be determined to gauge quality of the machine learning model for providing source-code recommendations. The quality of the machine learning model may be contextualized and/or assessed by comparing the source-code recommendations outputted by the machine learning model to source-code recommendations outputted by other existing machine learning models such as transformers and/or self-attention models.

At block 250, a natural language search query may be received. In some embodiments, the natural language search query may be received from a user. Additionally or alternatively, the natural language search query may be received from a computing system. In some embodiments, the natural language search query may be received via a text-input field in a software-development interface, environment, and/or application, such as an integrated development environment (IDE). The natural language search query may be a search query requesting source-code recommendations based on a natural language description of the source code (e.g., a description of how a source code functions written in English, Japanese, German, etc.).

At block 260, a source-code recommendation responsive to the natural language search query may be outputted. In some embodiments, the sections of source code and code comments may be paired as description-code vectors, and the natural language search query may be mapped to a search vector. The source-code recommendation may be outputted based on a comparison between the search vector and each of the description-code vectors. Comparison of the search vector to the one or more description-code vectors may be facilitated as described in further detail below in relation to FIG. 5. In some embodiments, the source-code recommendation may include one or more sections of source code, functions, and/or methods. In such embodiments, the one or more sections of source code, functions, and/or methods may be assembled as a set of lines of source code in which the set of lines of source code is responsive to the natural language search query. In these and other embodiments, the assembly of source code may include disparate sections of source code combined into a single cohesive set of lines of code to perform a task responsive to the natural language search query.

Modifications, additions, or omissions may be made to the method 200 without departing from the scope of the disclosure. For example, the designations of different elements in the manner described is meant to help explain concepts described herein and is not limiting. Further, the method 200 may include any number of other elements or may be implemented within other systems or contexts than those described.

Figure 3:
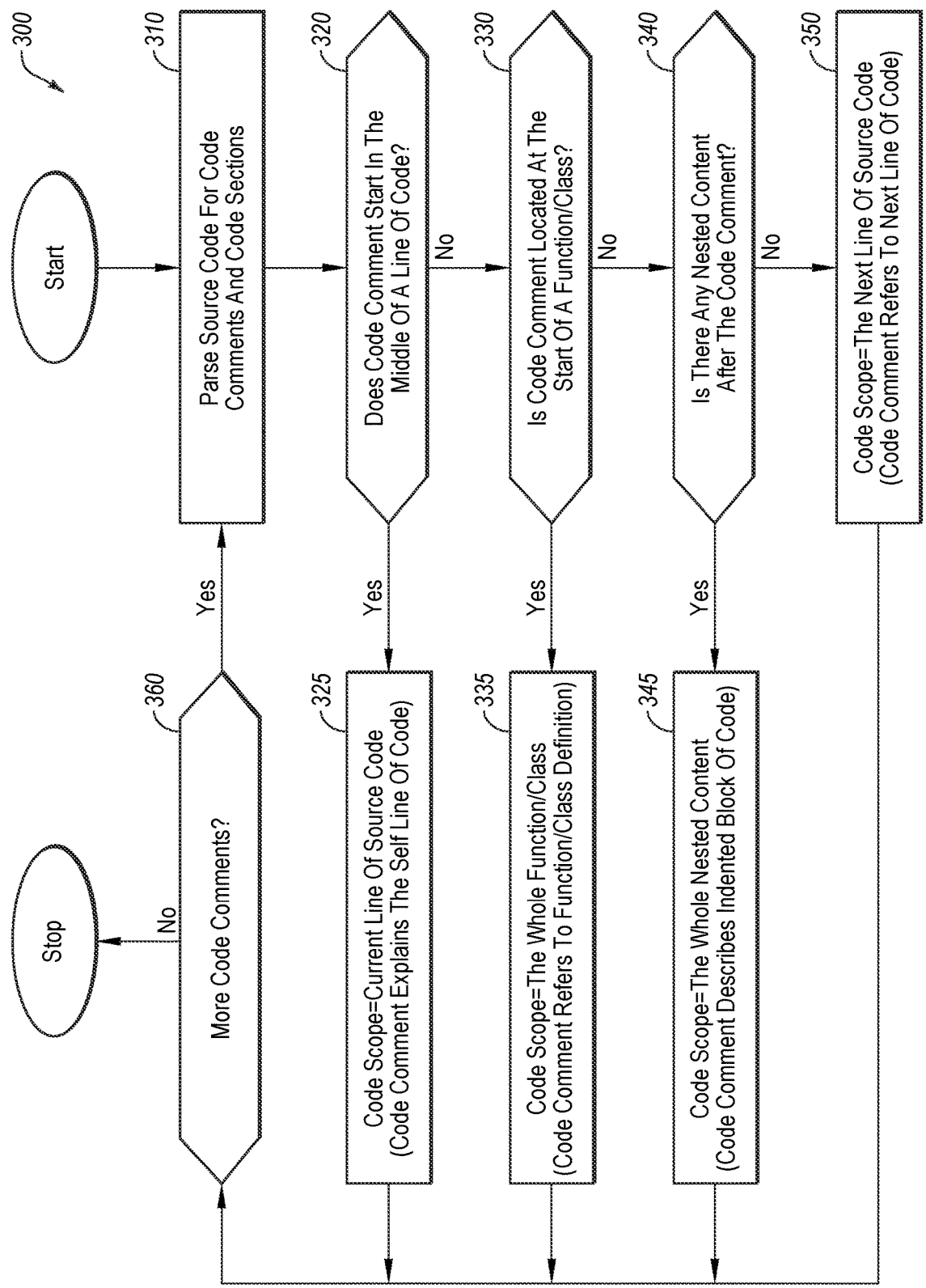
FIG. 3 is a flowchart of an example method of determining a scope of a code comment corresponding to a section of source code.

FIG. 3 is a flowchart of an example method 300 of determining a scope of a code comment corresponding to a section of source code. In some embodiments, the steps of method 300 may be performed as additional and/or alternative steps during the method 200. For example, the method 300 may be performed before, as a substitute to, and/or after parsing the source code for code comments and sections of source code at block 220. The method 300 may be performed by any suitable system, apparatus, or device. For example, the system 100, the source-code parser 120, and/or the machine learning model 130 may perform one or more of the operations associated with the method 300. Although illustrated with discrete blocks, the steps and operations associated with one or more of the blocks of the method 300 may be divided into additional blocks, combined into fewer blocks, or eliminated, depending on the particular implementation.

At block 310, obtained source code may be parsed to identify one or more code comments and/or to identify one or more sections of source code. Parsing the obtained source code may be accomplished by the same or a similar process as described in relation to block 220 of FIG. 2.

In some embodiments, a scope of a given code comment may be determined based on heuristics and/or rules as described in relation to blocks 320, 325, 330, 335, 340, 345, and 350. While such blocks provide one example, it will be appreciated that other approaches are also contemplated as within the scope of the present disclosure.

At block 320, a determination may be made whether the given code comment starts in the middle of a given line of code. If the given code comment begins in the middle of the given line of code, the method 300 may proceed to the block 325. If the given code comment does not begin in the middle of the given line of code, the method 300 may proceed to the block 330.

At block 325, the scope of the given code comment may be determined to include the line of source code on which the given code comment is found. After block 325, the method 300 may proceed to the block 360.

At block 330, a determination may be made whether the given code comment is located at the start of a function and/or class. For example, the given code comment may be located at the start of the function and/or class when the given code comment is located on a line of code preceding the start of the function and/or class. In these and other embodiments, the start of the function and/or class may be indicated by syntax signaling a function definition (e.g., "def" in PYTHON). If the given code comment is located at the start of a function and/or class, the method 300 may proceed to the block 335. If the given code comment is not located at the start of a function and/or class, the method 300 may proceed to the block 340.

At block 335, the scope of the given code comment may be determined to include the entire function and/or class (e.g., the given code comment may be identified as describing the entire function and/or class). After block 335, the method 300 may proceed to the block 360.

At block 340, a determination may be made whether any nested content exists after the given code comment. For example, if-then else or other nested content may be identified. If the source code includes nested content after the given code comment, the method 300 may proceed to the block 345. If the source code does not include nested content after the given code comment, the method 300 may proceed to the block 350.

At block 345, the scope of the given code comment may be determined to include the entire nested content. For example, the given code comment may be determined to describe an indented block of code corresponding to the nested content. After block 345, the method 300 may proceed to the block 360.

At block 350, the scope of the given code comment may be determined to include a line of source code immediately following the given code comment. For example, if the other heuristics and/or rules of the blocks 320, 330, and/or 340 do not otherwise identify the scope of the given code comment, the default and/or remainder scope may correspond to the next line of source code. After block 350, the method 300 may proceed to the block 360.

Determining the scope of the given code comment based on the heuristics described at blocks 320, 325, 330, 335, 340, and 345 may be performed in any order. For example, determining whether the given code comment is located at the start of a function and/or class at block 330 may occur before determining whether the given code comment starts in the middle line of the source code at block 320. As another example, determining whether any nested content exists after the code comment at block 340 may occur before determining whether the code comment is located at the start of a function and/or class at block 330.

At block 360, a determination may be made whether additional code comments exist. Responsive to determining additional code comments exist, the method 300 may proceed to block 310, and the obtained source code may be parsed for the additional code comments. Responsive to determining no additional code comments exist, the method 300 may end.

Modifications, additions, or omissions may be made to the method 300 without departing from the scope of the disclosure. For example, the designations of different elements in the manner described is meant to help explain concepts described herein and is not limiting. Further, the method 300 may include any number of other elements or may be implemented within other systems or contexts than those described.

Figure 4:
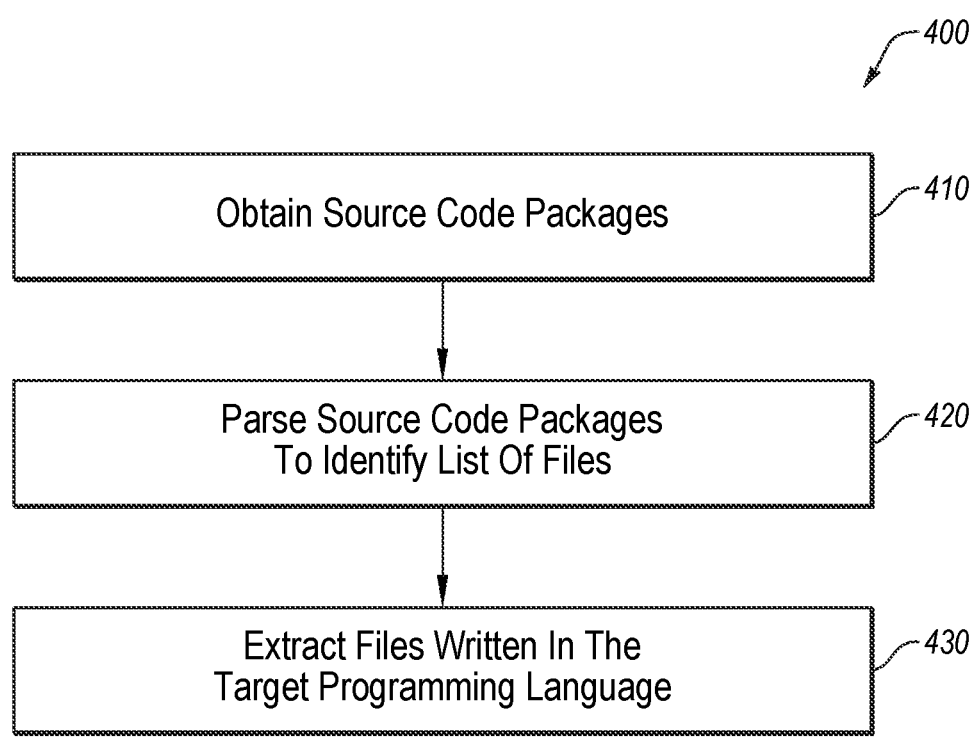
FIG. 4 is a flowchart of an example method of extracting source code from software packages.

FIG. 4 is a flowchart of an example method 400 of extracting source code from source-code packages. In some embodiments, the steps of method 400 may be performed as additional and/or alternative steps during the method 200. For example, the method 400 may be performed before, as a substitute to, and/or after obtaining the source code at block 210. The method 400 may be performed by any suitable system, apparatus, or device. For example, the system 100, the source-code parser 120, and/or the machine learning model 130 may perform one or more of the operations associated with the method 400. Although illustrated with discrete blocks, the steps and operations associated with one or more of the blocks of the method 400 may be divided into additional blocks, combined into fewer blocks, or eliminated, depending on the particular implementation.

At block 410, source-code packages may be obtained. A source-code package may include one or more pieces of source code. The pieces of source code included in a source-code package may be written in the same programming language. Additionally or alternatively, the pieces of source code included in a source-code package may be written in more than one programming language. In some embodiments, the source-code package may include folders and/or files that do not include source code, such as a readme.txt file containing text information about the source-code package. Source-code packages may be obtained from any location that includes source code and/or source-code packages, such as open-source repositories, publicly available code datasets, proprietary software, etc. For example, the source-code packages may be obtained from the CODESEARCHNET corpus, a dataset of source code collected from GITHUB. As another example, the source-code packages may be obtained from package repositories such as ANACONDA and/or PYPI for PYTHON, RUBYGEMS for RUBY, etc.

At block 420, the obtained source-code packages may be parsed to identify a list of files. For example, the source-code packages may be extracted such that files included in the source-code packages may be downloaded to a local disk. As another example, compressed files included in obtained source-code packages, such as .tgz, .gz, and .zip files, may be uncompressed such that the uncompressed files become accessible and extractable. In some embodiments, source code may be extracted from the source-code packages. For example, source code included in .tar archive files may be extracted, and the extracted source code may be sorted based on the programming language in which the extracted source code is written.

At block 430, source code written in a target programming language may be extracted from the parsed list of files from the obtained source-code packages. The extracted source code may be used to generate the augmented programming language corpus as described above in relation to FIG. 2. Source code written in the target programming language may be identified based on a file extension associated with each piece of source code. For example, PYTHON source code may be included in files having the .py file extension, JAVASCRIPT source code may be included in files having the .js file extension, and C++ source code may be included in files having the .cpp file extension. The extracted source-code packages may be traversed for files including file extensions corresponding to the target programming language. In some embodiments, metadata information relating to the target programming language may be extracted from the source-code package. Such metadata information may be included in files including the same or related file extensions as source code that the metadata information describes. Additionally or alternatively, metadata information may be included in text files having text-document file extensions, such as .txt, .docx, and/or .pdf files. As another example, extracted source-code may be associated with a given programming language based on the syntax of the source-code and/or any other factors.

Modifications, additions, or omissions may be made to the method 400 without departing from the scope of the disclosure. For example, the designations of different elements in the manner described is meant to help explain concepts described herein and is not limiting. Further, the method 400 may include any number of other elements or may be implemented within other systems or contexts than those described.

Figure 5:
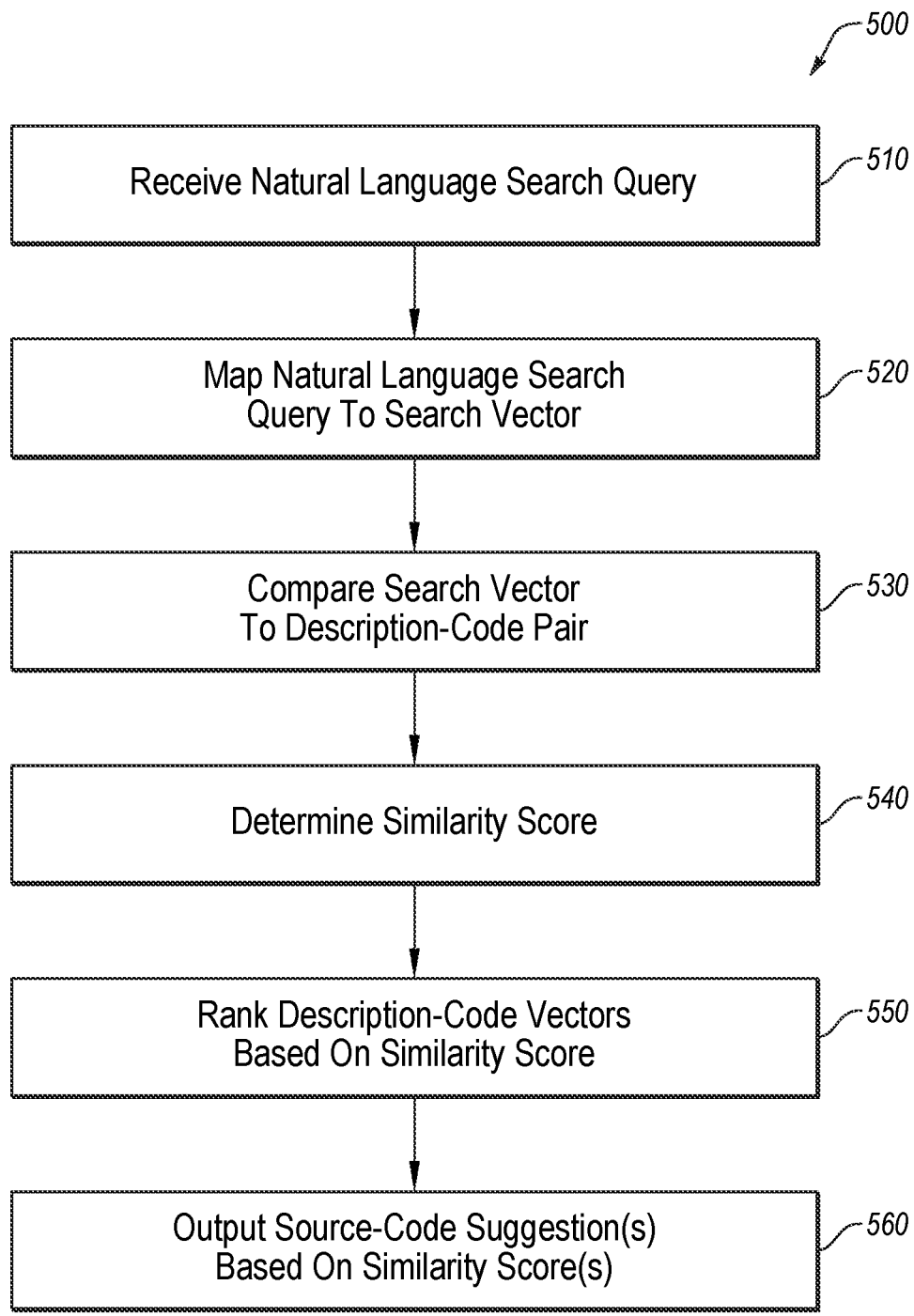
FIG. 5 is a flowchart of an example method of performing the code search based on the augmented programming language corpus and the natural language search query.

FIG. 5 is a flowchart of an example method 500 of performing the code search based on the augmented programming language corpus and the natural language search query. In some embodiments, the steps of method 500 may be performed as additional and/or alternative steps during the method 200. For example, the method 500 may be performed before, as a substitute to, and/or after receiving the natural language search query at block 250. The method 500 may be performed by any suitable system, apparatus, or device. For example, the system 100, the source-code parser 120, and/or the machine learning model 130 may perform one or more of the operations associated with the method 500. Although illustrated with discrete blocks, the steps and operations associated with one or more of the blocks of the method 500 may be divided into additional blocks, combined into fewer blocks, or eliminated, depending on the particular implementation.

At block 510, a natural language search query may be received. The natural language search query may be similar to and/or received as described above in relation to FIG. 2.

At block 520, the natural language search query may be mapped to a search vector. Mapping the natural language search query to the search vector may include preparing the natural language search query for vectorization, for example, by removing unnecessary text from the query and tokenizing the query. Tokenizing the natural language search query may include dividing the natural language search query into individual words. For example, a natural language search query of "plot a line" may be tokenized into the three individual words "plot," "a," and "line" or into two words including "plot" and "line."

At block 530, the search vector may be compared to a description-code vector. Because the search vector and the description-code vector may both be represented as vectors, the search vector may be compared to the description-code vector using any vector comparison method, such as cosine similarity, Euclidean similarity, Canberra distance, Chebyshev distance, Manhattan distance, etc.

At block 540, a similarity score between the search vector and the description-code vector may be determined. In some embodiments, the similarity score between the search vector and the description-code vector may be determined based on the vector comparison performed at block 530. In these and other embodiments, the similarity score may be calculated based on an absolute value of the vector comparison. Additionally or alternatively, the similarity score may be calculated based on a relative value of the vector comparison. For example, a given search vector compared to a given description-code vector using cosine similarity may result in a cosine similarity value ranging from −1 to 1 in which −1 indicates the search vector and the description-code vector are exactly opposite to one another and 1 indicates the search vector and the description-code vector are exactly the same. A similarity score calculated based on an absolute value of the vector comparison may be equal to the cosine similarity value between the given search vector and the given description-code vector. In these and other embodiments, a similarity score calculated based on a relative value of the vector comparison may be a normalized value based on the given cosine similarity value between the given search vector and the given description-code vector. For example, a given cosine similarity value of 0 may correspond to a relative similarity score of 0.5 out of 1.0, 5 out of 10, 50 out of 100, etc. As another example a given cosine similarity value of 0.9 may correspond to a relative similarity score of 0.95 out 1.0, 9.5 out of 10, 95 out of 100, etc.

At block 550, description-code vectors may be ranked based on the similarity score between the search vector and each of the description-code vectors (or a subset thereof), and one or more source-code recommendations may be outputted based on the similarity scores between the search vector and the description-code vectors. In some embodiments, description-code vectors to which the search vector is compared may be ranked such that description-code vectors having greater similarity scores are ranked more highly. Description-code vectors may correspond to source-code recommendations based on the source-code element associated with each of the description-code vectors. Description-code vectors having greater similarity scores may correspond to sections of source code having greater relevance to a given natural language search query. In some embodiments, a source-code recommendation may be outputted based on the description-code vector having the greatest similarity score. Additionally or alternatively, more than one source-code recommendations may be outputted based on the description-code vectors having the greatest similarity scores. A number of source-code recommendations to be outputted may be designated, such as by a user and/or a computing system. For example, a user seeking source-code recommendations based on a natural language search query may specify that the top ten source-code recommendations are outputted. In some embodiments, the number of source-code recommendations to be outputted may be designated based on a threshold similarity score. Additionally or alternatively, the source-code recommendations may include all of the description-code vectors to which the search vector is compared as a ranked list based on the similarity score corresponding to each description-code vector.

Modifications, additions, or omissions may be made to the method 500 without departing from the scope of the disclosure. For example, the designations of different elements in the manner described is meant to help explain concepts described herein and is not limiting. Further, the method 500 may include any number of other elements or may be implemented within other systems or contexts than those described.

Figure 6:
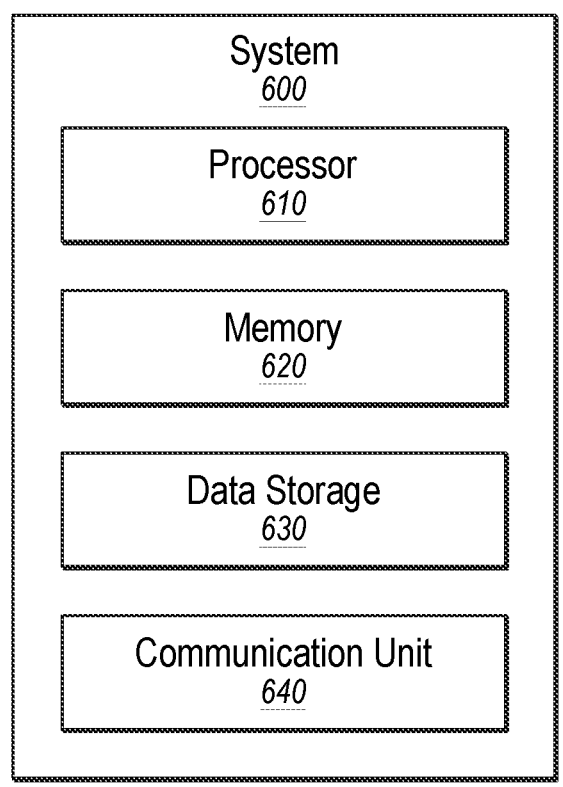
FIG. 6 is an example computing system.

FIG. 6 illustrates an example computing system 600, according to at least one embodiment described in the present disclosure. The computing system 600 may include a processor 610, a memory 620, a data storage 630, and/or a communication unit 640, which all may be communicatively coupled. Any or all of the system 100 of FIG. 1 may be implemented as a computing system consistent with the computing system 600, including the source-code parser 120 and/or the machine learning model 130.

Generally, the processor 610 may include any suitable special-purpose or general-purpose computer, computing entity, or processing device including various computer hardware or software modules and may be configured to execute instructions stored on any applicable computer-readable storage media. For example, the processor 610 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 6, it is understood that the processor 610 may include any number of processors distributed across any number of network or physical locations that are configured to perform individually or collectively any number of operations described in the present disclosure. In some embodiments, the processor 610 may interpret and/or execute program instructions and/or process data stored in the memory 620, the data storage 630, or the memory 620 and the data storage 630. In some embodiments, the processor 610 may fetch program instructions from the data storage 630 and load the program instructions into the memory 620.

After the program instructions are loaded into the memory 620, the processor 610 may execute the program instructions, such as instructions to perform any of the methods 200, 300, 400, and/or 500 of FIGS. 2, 3, 4, and 5, respectively. For example, the processor 610 may obtain instructions regarding obtaining software-repository packages, extracting programming-language functions from the software-repository packages, identifying curation resources, generating code descriptions based on the curation resources, determining function-comment pairs, and/or generating a programming language corpus.

The memory 620 and the data storage 630 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 610. For example, the memory 620 and/or the data storage 630 may store obtained source code as described in relation to FIG. 2 and/or software packages as described in relation to FIG. 4. In some embodiments, the computing system 600 may or may not include either of the memory 620 and the data storage 630.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 610 to perform a certain operation or group of operations.

The communication unit 640 may include any component, device, system, or combination thereof that is configured to transmit or receive information over a network. In some embodiments, the communication unit 640 may communicate with other devices at other locations, the same location, or even other components within the same system. For example, the communication unit 640 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 640 may permit data to be exchanged with a network and/or any other devices or systems described in the present disclosure. For example, the communication unit 640 may allow the system 600 to communicate with other systems, such as computing devices and/or other networks.

One skilled in the art, after reviewing this disclosure, may recognize that modifications, additions, or omissions may be made to the system 600 without departing from the scope of the present disclosure. For example, the system 600 may include more or fewer components than those explicitly illustrated and described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
obtaining, by a processor, machine-readable source code;
parsing, by the processor, the source code for one or more code descriptions;
identifying, by the processor, a section of the source code corresponding to a code description of the one or more code descriptions;
determining, by the processor, a description-code pair, the description-code pair including a first element representing the code description and a second element representing the section of the source code corresponding to the code description;
generating, by the processor, an augmented programming language corpus using the description-code pair, the one or more code descriptions, and the source code;
training, by the processor, a machine learning model to provide source-code recommendations based on the augmented programming language corpus;
receiving, by the processor, a natural language search query for a source-code recommendation;
identifying, by the processor using the machine learning model, the source code responsive to the search query; and
responding, by the processor, to the natural language search query with the source code identified from the augmented programming language corpus.

2. The method of claim 1, wherein the one or more code descriptions are code comments and identifying the section of the source code corresponding to a code description of the one or more code descriptions comprises:
determining, by the processor, one or more heuristics relating a location of the code comment in a piece of source code to the section of the source code;
determining, by the processor, the location of the code comment in the piece of source code; and
locating, by the processor, the section of the source code to which the code comment corresponds based on the one or more heuristics and the location of the code comment in the piece of source code.

3. The method of claim 1, wherein the natural language search query is received via a text-input field in an integrated development environment (IDE), the IDE including an interface for software development.

4. The method of claim 1, wherein obtaining source code comprises:
obtaining, by the processor, a source-code package;
parsing, by the processor, the source-code package to identify one or more files, each file of the one or more files including at least a portion of the source code; and
parsing, by the processor, the one or more files to identify files written in a target programming language.

5. The method of claim 1, further comprising:
generating, by the processor, a negatively classified example based on the description-code pair; and
training, by the processor, the machine learning model to provide source-code recommendations based on the augmented programming language corpus and the negatively classified example.

6. The method of claim 1, wherein responding to the natural language search query with the source code identified from the augmented programming language corpus comprises:
mapping, by the processor, the natural language search query to a search vector;
comparing, by the processor, the search vector to each description-code pair;
determining, by the processor, a similarity score between the search vector and each description-code pair based on a cosine similarity between the search vector and each description-code pair; and
returning, by the processor, the source code corresponding to the description-code pair based on the similarity score between the search vector and each description-code pair.

7. The method of claim 6, wherein returning the source code corresponding to the description-code pair based on the similarity score between the search vector and each description-code pair comprises:
ranking, by the processor, description-code pairs based on the similarity score between the search vector and each description-code pair; and
returning, by the processor, one or more pieces of the source code corresponding to the description-code pairs based on the ranking.

8. One or more non-transitory computer-readable storage media configured to store instructions that, in response to being executed, cause a system to perform operations, the operations comprising:
obtaining machine-readable source code;
parsing the source code for one or more code descriptions;
identifying a section of the source code corresponding to a code description of the one or more code descriptions;
determining a description-code pair, the description-code pair including a first element representing the code description and a second element representing the section of the source code corresponding to the code description;
generating an augmented programming language corpus using the description-code pair, the one or more code descriptions, and the source code;
training a machine learning model to provide source-code recommendations based on the augmented programming language corpus;
receiving a natural language search query for a source-code recommendation;
identifying, by the machine learning model, the source code from the augmented programming language corpus responsive to the natural language search query; and
responding to the natural language search query with the source code identified from the augmented programming language corpus.

9. The one or more non-transitory computer-readable storage media of claim 8, wherein the one or more code descriptions are code comments and identifying the section of the source code corresponding to a code description of the one or more code descriptions comprises:
determining one or more heuristics relating a location of the code comment in a piece of source code to the section of the source code;
determining the location of the code comment in the piece of source code; and locating the section of the source code to which the code comment corresponds based on the one or more heuristics and the location of the code comment in the piece of source code.

10. The one or more non-transitory computer-readable storage media of claim 8, wherein the natural language search query is received via a text-input field in an integrated development environment (IDE), the IDE including an interface for software development.

11. The one or more non-transitory computer-readable storage media of claim 8, wherein obtaining source code comprises:
    obtaining a source-code package;
    parsing the source-code package to identify one or more files, each file of the one or more files including at least a portion of the source code; and
    parsing the one or more files to identify files written in a target programming language.

12. The one or more non-transitory computer-readable storage media of claim 8, further comprising:
    generating a negatively classified example based on the description-code pair; and
    training the machine learning model to provide source-code recommendations based on the augmented programming language corpus and the negatively classified example.

13. The one or more non-transitory computer-readable storage media of claim 8, wherein responding to the natural language search query with the source code identified from the augmented programming language corpus comprises:
    mapping the natural language search query to a search vector; comparing the search vector to each description-code pair;
    determining a similarity score between the search vector and each description-code pair based on a cosine similarity between the search vector and each description-code pair; and
    returning the source code corresponding to the description-code pair based on the similarity score between the search vector and each description-code pair.

14. The one or more non-transitory computer-readable storage media of claim 13, wherein returning the source code corresponding to the description-code pair based on the similarity score between the search vector and each description-code pair comprises:
    ranking description-code pairs based on the similarity score between the search vector and each description-code pair; and
    returning one or more pieces of the source code corresponding to the description-code pairs based on the ranking.

15. A system comprising:
    one or more processors; and
    one or more non-transitory computer-readable storage media configured to store instructions that, in response to being executed, cause the system to perform operations, the operations comprising:
    obtaining machine-readable source code;
    parsing the source code for one or more code descriptions;
    identifying a section of the source code corresponding to a code description of the one or more code descriptions;
    determining a description-code pair, the description-code pair including a first element representing the code description and a second element representing the section of the source code corresponding to the code description;
    generating an augmented programming language corpus using the description-code pair, the one or more code descriptions, and the source code;
    training a machine learning model to provide source-code recommendations based on the augmented programming language corpus;
    receiving a natural language search query for a source-code recommendation;
    identifying, by the machine learning model, the source code from the augmented programming language corpus; and
    responding to the natural language search query with the source code identified from the augmented programming language corpus.

16. The system of claim 15, wherein the one or more code descriptions are code comments and identifying the section of the source code corresponding to a code description of the one or more code descriptions comprises:
    determining one or more heuristics relating a location of the code comment in a piece of source code to the section of the source code;
    determining the location of the code comment in the piece of source code; and
    locating the section of the source code to which the code comment corresponds based on the one or more heuristics and the location of the code comment in the piece of source code.

17. The system of claim 15, wherein the natural language search query is received via a text-input field in an integrated development environment (IDE), the IDE including an interface for software development.

18. The system of claim 15, wherein obtaining source code comprises:
    obtaining a source-code package;
    parsing the source-code package to identify one or more files, each file of the one or more files including at least a portion of the source code; and
    parsing the one or more files to identify files written in a target programming language.

19. The system of claim 15, further comprising:
    generating a negatively classified example based on the description-code pair; and
    training the machine learning model to provide source-code recommendations based on the augmented programming language corpus and the negatively classified example.

20. The system of claim 15, wherein responding to the natural language search query with the source code identified from the augmented programming language corpus comprises:
    mapping the natural language search query to a search vector;
    comparing the search vector to each description-code pair;
    determining a similarity score between the search vector and each description-code pair based on a cosine similarity between the search vector and each description-code pair; and
    returning the source code corresponding to the description-code pair based on the similarity score between the search vector and each description-code pair.

* * * * *